(12) United States Patent  (10) Patent No.: US 8,142,053 B2
Hurwitz  (45) Date of Patent: Mar. 27, 2012

(54) INTERCHANGEABLE ATTACHMENTS FOR COLLARS, LEASHES, BELTS AND ACCESSORIES

(75) Inventor: Marni Markell Hurwitz, Far Hills, NJ (US)

(73) Assignee: I Did It, Inc., Far Hills, NJ (US)

( * ) Notice: Subject to any disclaimer, the term of this patent is extended or adjusted under 35 U.S.C. 154(b) by 363 days.

(21) Appl. No.: 12/460,705

(22) Filed: Jul. 23, 2009

(65) Prior Publication Data

US 2010/0277943 A1  Nov. 4, 2010

Related U.S. Application Data

(60) Provisional application No. 61/215,370, filed on May 4, 2009.

(51) Int. Cl.
*F21S 2/00* (2006.01)
(52) U.S. Cl. .................... 362/249.16; 362/565
(58) Field of Classification Search .......... 362/555, 362/554, 570, 565, 103, 108, 653, 249.16
See application file for complete search history.

(56) References Cited

U.S. PATENT DOCUMENTS

| | | | |
|---|---|---|---|
| 3,871,336 A | 3/1975 | Bergman | 119/106 |
| 3,999,521 A | 12/1976 | Puiello | 359/518 |
| 4,167,156 A | 9/1979 | Kupperman | 119/795 |
| 4,173,201 A | 11/1979 | Chao | 119/859 |
| 4,513,692 A | 4/1985 | Kuhnsman | 119/797 |
| 4,887,552 A | 12/1989 | Hayden | 119/793 |
| 4,895,110 A | 1/1990 | LoCascio | 119/859 |
| 5,046,456 A | 9/1991 | Heyman | 119/859 |
| 5,140,946 A | 8/1992 | Pennock | 119/859 |
| 5,363,809 A | 11/1994 | Roe | 119/792 |
| 5,370,082 A | 12/1994 | Wade | 119/859 |
| 5,429,075 A | 7/1995 | Passarella | 119/795 |
| 5,523,927 A | 6/1996 | Gokey | 362/103 |
| 5,535,106 A * | 7/1996 | Tangen | 362/108 |
| 5,558,044 A | 9/1996 | Nasser, Jr. | 119/796 |
| 5,630,382 A | 5/1997 | Barbera | 199/859 |
| 5,762,029 A | 6/1998 | DuBois | 119/796 |
| 5,850,807 A | 12/1998 | Keeler | 119/799 |
| 5,967,095 A | 10/1999 | Greves | 119/795 |
| 6,170,968 B1 | 1/2001 | Caswell | 362/469 |
| 6,289,849 B1 | 9/2001 | Macedo | 119/796 |
| 6,557,498 B1 | 5/2003 | Smierciak | 119/858 |
| 7,350,342 B2 | 4/2008 | Owens | 54/12 |
| 7,421,980 B1* | 9/2008 | Ehlers | 119/858 |
| 2004/0246706 A1* | 12/2004 | Simoni | 362/108 |

* cited by examiner

*Primary Examiner* — David V Bruce
(74) *Attorney, Agent, or Firm* — Ernest D. Buff; Ernest D. Buff & Assoc. LLC; Margaret A. LaCroix

(57) ABSTRACT

An article, including pet collars and leashes, belts, bags and backpacks, has an interchangeable attachment. The article comprises a proximal end, distal end and a central section having at least one connection mechanism appointed to receive the interchangeable attachment. The interchangeable attachment includes a top wall having a show surface and a back wall having a securing member adapted to engage with the connection mechanism of the article for removably attaching the interchangeable attachment to the article. In one embodiment the interchangeable attachments are provided as button-type attachments. In another embodiment, the interchangeable attachment is provided as an elongated attachment portion appointed to substantially cover the central section of the article. The interchangeable attachments have a plethora of designs and may include LED, fiber optic and/or reflective properties to provide aesthetic appeal, enhanced visibility, and increased safety for pedestrians during nighttime or dusk hours.

19 Claims, 7 Drawing Sheets

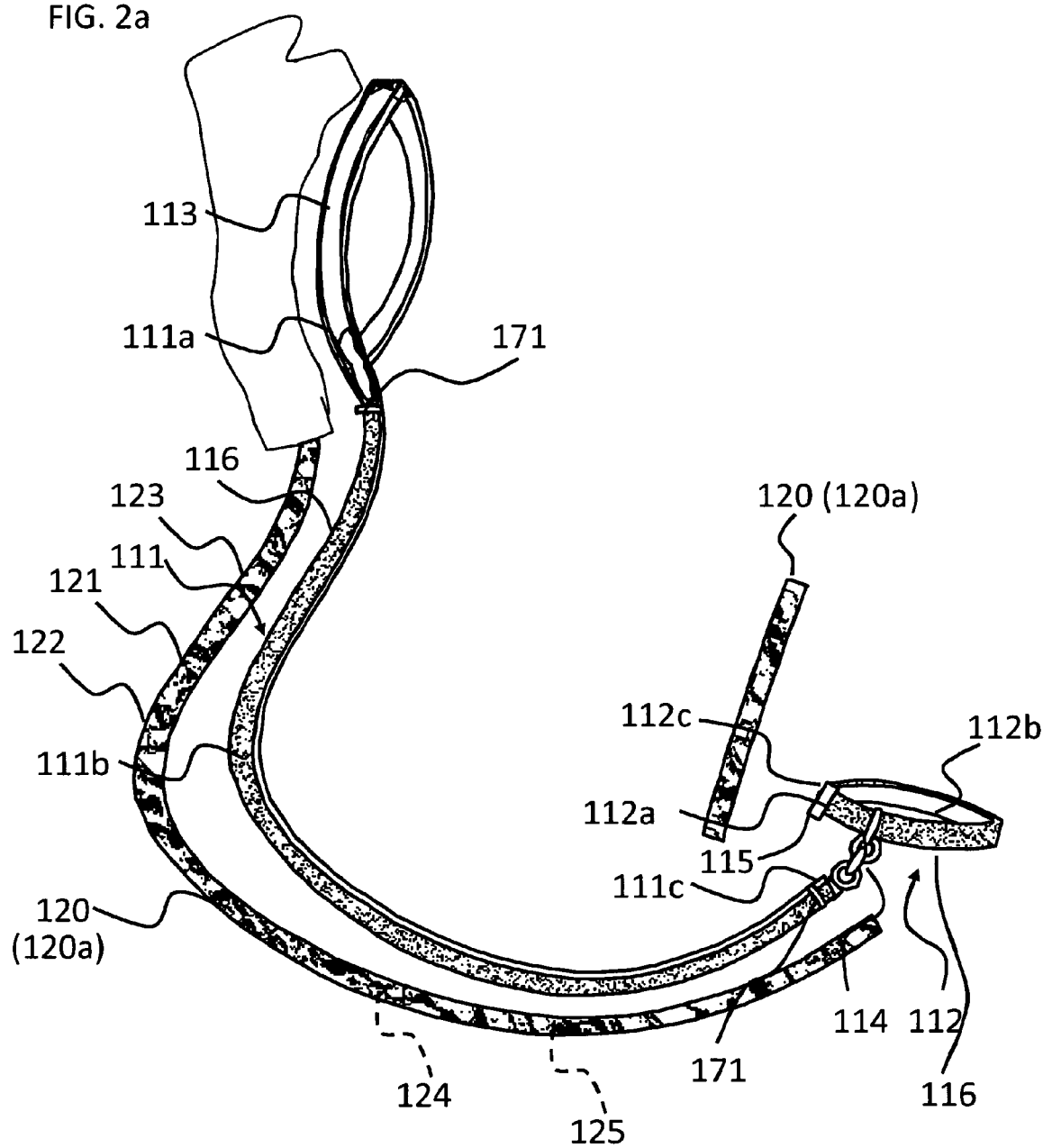

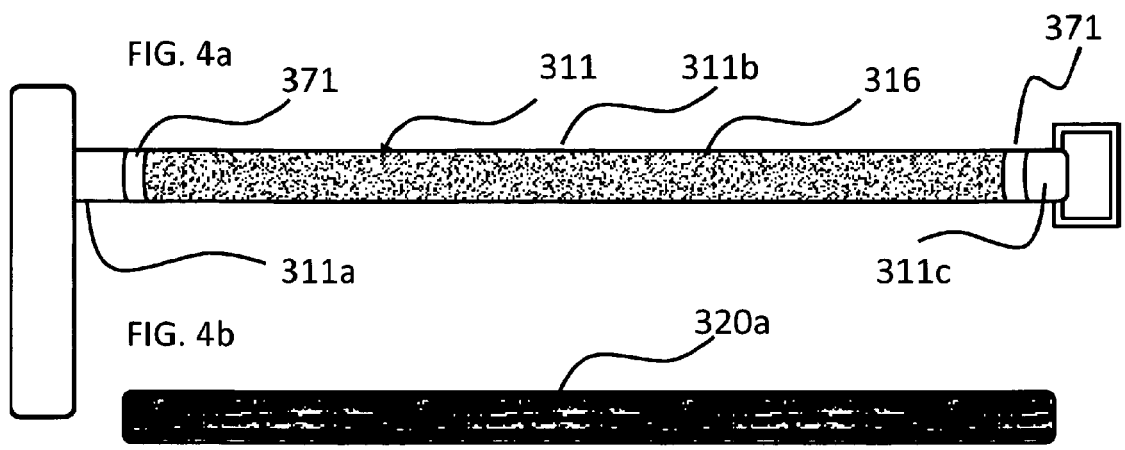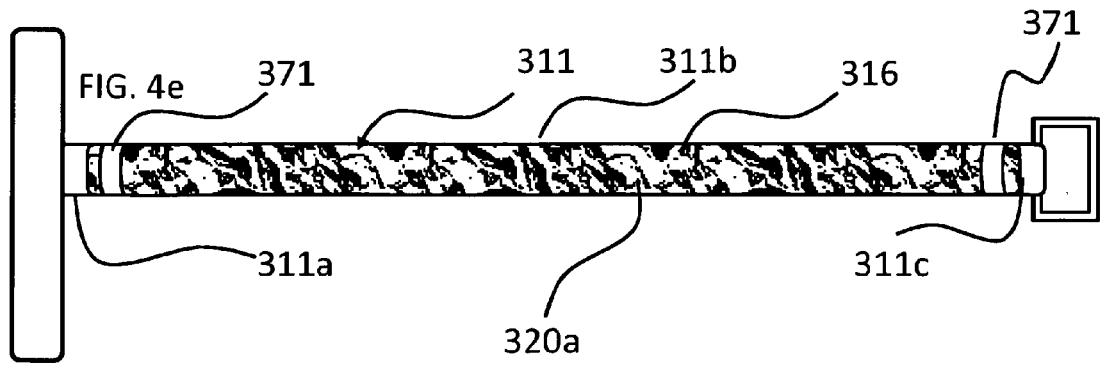

INTERCHANGEABLE ATTACHMENTS FOR COLLARS, LEASHES, BELTS AND ACCESSORIES

This application claims the benefit of Provisional Application No. 61/215,370, filed May 4, 2009, the subject matter of which is hereby incorporated in its entirety by reference thereto.

BACKGROUND OF THE INVENTION

1. Field of the Invention

The present invention relates to interchangeable attachments for collars, leashes, belts and accessories, such as bags and backpacks; and more particularly, to interchangeable attachments having various designs, LED and/or reflective properties, that are readily removably attached to a portion of a collar, leash, belt and/or accessory, to provide aesthetic appeal and enhance visibility of the items with which they are associated, thereby increasing user safety while walking in the vicinity of land vehicles during dusk or nighttime hours.

2. Description of the Prior Art

Walking during dusk or nighttime hours can be hazardous in neighborhoods where automobiles are encountered. Illuminating characteristics of the automobile headlamps, generally afford an illumination range of approximately 25 to 50 feet. This illumination range can be significantly reduced by mist or fog, or bends in the road. Despite improvements to vehicle headlights, pedestrians, as well as pets and their owners walking, are oftentimes not recognized by automobile drivers until the distance between the automobile and the pedestrian or pet is small.

Several approaches devised by prior art workers attempt to provide solutions for safety concerns of pedestrians and pets. These approaches include 1) use of pet collars that are illuminated or reflective; 2) use of leashes which are illuminated or reflective; or 3) a combination of both features. None of these solutions suggest indicating the whereabouts of a pet owner, a leash and a pet attached to the leash, or a pedestrian or child via LED or reflective attachments appointed to removably attach to a leash, collar, or accessory, such as a backpack.

Various types of illuminated dog collars using bulb or other powered sources are known in the art. These power-illuminated leashes require batteries, light bulbs or other lighting elements, and are not provided as decorative, removable attachments. For examples, see: U.S. Pat. Nos. 4,173,201; 4,513,692; 4,895,110; 4,887,552; 5,046,456; 5,140,946; 5,370,082; 5,429,075; 5,523,927; 5,535,106; 5,558,044; 5,630,382; 5,762,029; 5,850,807; 5,967,095; 6,170,968; 6,289,849; and 6,557,498. None of these power-illuminated leashes provides decorative, removable LED attachments and/or decorative reflective attachments. Dog collars, harness and leashes which include reflection capabilities are known in the art., but each fail to provide decorative attachments including reflective properties. For examples, see: U.S. Pat. Nos. 3,871,336; 3,999,521; and 4,167,156.

Beyond safety concerns, many individuals and children prefer to personalize their accessories, such as belts, bags and backpacks, in a manner that does not permanently alter the accessory. However, these designs and other decorative items require permanent application to the accessory. Further, many pet owners like to decorate their pets and utilize jeweled collars and the like. Unfortunately, collars and leashes which include designs are not designed uniquely by the individual and are permanent in nature.

Some decorative devices for leashes have been provided, however the decorative devices fail to provide a plurality of decorative removable attachments, and further fail to provide the ability for an individual to readily change the decoration when desired. For examples, see: U.S. Pat. Nos. 5,363,809; 7,350,342; and 7,421,980.

Notwithstanding the efforts of prior art workers to construct decorative collars, leashes, belts and/or accessories, there is a need in the art for interchangeable attachments appointed to be removably attached to collars, leashes, belts and accessories. Additionally, there is a need in the art for interchangeable attachments having various designs, LED and/or reflective properties that are removably attached to a portion of a collar, leash, belt and/or accessory, to provide aesthetic appeal and/or to provide pedestrians with enhanced visibility and increased safety from vehicles during dusk or nighttime hours.

SUMMARY OF THE INVENTION

The present invention provides interchangeable attachments appointed to be removably attached to collars, leashes, belts and accessories. A plethora of designs are provided on the show surface of the subject interchangeable attachments. The interchangeable attachments are provided via various designs and may further include LED and/or reflective properties integrated therein so that the attachments can be readily removably attached to a portion of a collar, leash, belt and/or accessory, to provide aesthetic appeal and/or to provide enhanced safety from vehicles during dusk or nighttime hours. Further, the show surface of the interchangeable attachments may have different textured appearances, such as smooth, silky, rough, leather, metallic or jeweled. In one embodiment the interchangeable attachments are presented as snap-in button-type attachments and/or magnetic attachments. In another embodiment the interchangeable attachments are provided as elongated attachment portions that removably adhere to a central section of a body of a collar, leash, bag strap, or belt to provide an interchangeable show surface and ultimately change the look of the article.

This invention pertains to attachments for accessories, such as bags and back packs, and pet accessories, such as leashes and collars for household pets, that can be individualized by a person or a pet owner and offer high visibility at dusk, and in other dimly lit environments. In one embodiment, a plurality of LED Buttons can be secured to a pet collar or leash, to improve visibility during daytime and nighttime excursions with the pet. Applications are appointed for use on leashes and collars, as well as for use on bags, backpacks, and belts.

In an alternative embodiment, a plurality of holes are integrated in a leash or collar central section, or a central section of a strap of a bag or a portion of a belt, that are appointed to receive a decorative attachment. The decorative attachments may be of a plethora of designs and may include an LED integrated therein, and/or reflective properties. Attachments may be created to accept the LED or any kind of Optics that are used for fun and to create a more visible pet or person. The attachments provided as LED buttons, optics, gems, or charms are to be inserted into the designed holes to create a more individual piece, while providing enhanced safety via more visibility. Enhanced safety is not only afforded, but the attachments allow a user freedom of choice to design a creation of their own individual preference. Shapes, sizes and designs presented by the plethora of attachments are all different. Selection of the attachments as well as arrangement on the leash, collar or accessory is uniquely determined by the person. Preferably, the attachments are presented as snap on buttons and are sold in a package containing at least one attachment, or more than one. The snap in attachments have a back piece that lays flat once inserted through the hole, or may have a ball like end that inserts and remains secure when in place, so the back portion of the attachment or LED or optic button/charm piece may vary in design. Alternatively, the attachment may be an independent piece retrofitted with a clip-like backing that holds it in place against the strap. The LED's and the optic light are used with a small watch battery, and last a long time, so battery life does not become a concern.

In another embodiment, the attachment is provided as an interchangeable elongated central section overlay which is appointed to be removably received over the central section of a leash or collor portion. Preferably, mating hook and loop fastener portions (such as sold under the trademark VEL-CRO) are provided on the elongated central overlay attachment and central section of the leash or collar portion. Preferably, the elongated attachments are sold with the collar, and/or leash, or bag, or belt to offer an alternative design. In operation, the user simply presses the elongated attachment to removably affix it the central section of the body of the collar, leash, or bag, and a new look or design yields. For removal, the user simply peels the elongated attachment from the central section of the body of the collar, leash, and/or bag. Reflective material or LED or fiber optics may be integrated within the elongated attachment for extra visibility when wearing. The elongated attachments can be used on bag or backpack straps and/or belts, particularly for children.

An interchangeable attachment for an article, including pet collars and leashes, belts, bags and backpacks is provided. The article has at least one elongated region comprising a proximal end, distal end and a central section having at least one connection means appointed to receive an interchangeable attachment. The interchangeable attachment includes a top wall having a show surface and a back wall having a securing member adapted to engage with the connection means of the article for removably attaching the interchangeable attachment to the article. In one embodiment the interchangeable attachments are provided as button-type attachments. In another, the interchangeable attachment is provided as an elongated attachment portion appointed to substantially cover the central section of the elongated region of the article. The interchangeable attachments have a plethora of designs and may include LED, fiber optic and/or reflective properties to provide both aesthetic appeal and enhance safety during nighttime or dusk hours.

In a broad embodiment, an interchangeable attachment for an article, is provided comprising a top wall having a show surface, side walls, and a back wall having a securing member adapted to secure the interchangeable attachment to the article. The interchangeable attachment may be a button-type/snap-type interchangeable attachment, or may be an elongated interchangeable attachment portion. The article is preferably a leash, collar, belt, and/or straps of a bag or back pack.

A process for manufacture of an interchangeable attachment for an article is also provided. The process includes the steps of (i) forming the article comprising at least one elongated region comprising a proximal end, distal end and a central section, (ii) forming at least one connection means within the central section of the elongated region of the article, the connection means being adapted to receive the interchangeable attachment, and (iii) forming the interchangeable attachment comprising a top wall having a show surface, side walls, and a back wall having an securing member adapted to engage with the connection means of the central section of the article for removably attaching the interchangeable attachment to the elongated region of the article.

Interchangeable attachments effectively temporarily alter the article's appearance and can provide safety to the user where LED, optics, or reflective properties are included features of the interchangeable attachments. In operation, the interchangeable attachments are simply added-on to the article by engaging the connection means of the elongated region of the article with the securing member of the interchangeable attachments. When desired, the interchangeable attachment is simply removed from the article to once again change the look.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 2a is a schematic view of another embodiment of the interchangeable attachment for an article, showing a leash and collar wherein elongated interchangeable attachment portions are presented and are ready to be attached to the leash and collar;

FIGS. 4a-4e illustrate a top view of a the application of and selection of an elongated interchangeable attachment portion to a belt, leash, collar, or bag strap;

FIG. 5b shows a back view of the back pack of FIG. 5a.

DETAILED DESCRIPTION OF THE INVENTION

The present invention provides interchangeable attachments for an article, including pet collars and leashes, belts, bags and backpacks. The article has at least one elongated region comprising a proximal end, distal end and a central section having at least one connection means appointed to receive an interchangeable attachment. The interchangeable attachment includes a top wall having a show surface and a back wall having a securing member adapted to engage with the connection means of the article for removably attaching the interchangeable attachment to the article. In one embodiment the interchangeable attachments are provided as button-type attachments. In another, the interchangeable attachment is provided as an elongated attachment portion appointed to substantially cover the central section of the elongated region of the article. The interchangeable attachments have a plethora of designs and may include LED, fiber optic and/or reflective properties to provide both aesthetic appeal and enhance safety during nighttime or dusk hours.

Figure 1:
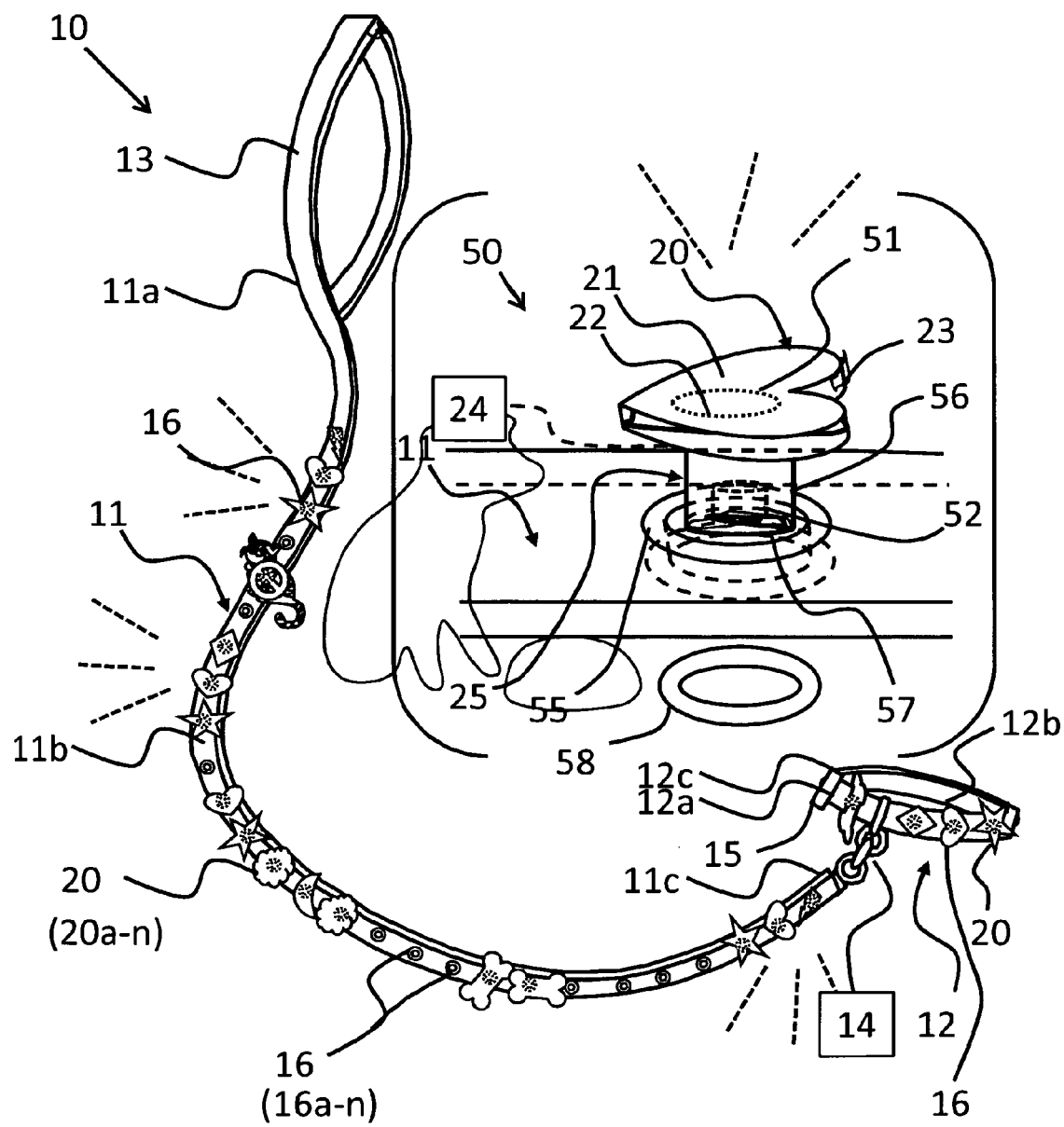
FIG. 1 is a schematic view of an embodiment of the interchangeable attachment for an article, wherein a plurality of interchangeable attachments are provided as button-type or snap on attachments that are added-onto a pet leash and pet collar, and further shows an expanded view of an interchangeable attachment having a shaft portion and an end cap portion and the leash connection means being an aperture.

FIG. 1 is a schematic view of an embodiment of the interchangeable attachment for an article, wherein a plurality of interchangeable attachments are provided as button-type or snap on attachments added-onto a pet leash and pet collar, shown generally at 10. FIG. 1 further shows an expanded view of an interchangeable attachment having a shaft portion and an end cap portion and the leash connection means being an aperture, shown generally at 50. The article herein is shown as a leash and collar; however, the article can be a belt, purse, bag or backpack, or pet carrier (for an illustration of the back pack see FIG. 5a-5b). A leash and collar are shown with a plurality of interchangeable attachments added-on to the articles (leash 11 and collar 12). Leash 11 and collar 12 each have at least one elongated region comprising a proximal end 11a, 12a, distal end 11c, 12c and a central section 11b, 12b. Proximal end 11a of leash 11 includes a handle 13, while distal end 11c includes a clasp 14 (or may be looped and formed into a choke collar). Distal end 12c of collar 12 includes a buckle 15 appointed to receive proximal end 12a of collar 12 to clasp around a dog's neck. The central section 11b, 12b of the leash 11 and collar 12 have at least one connection means 16 (16a-n) appointed to receive interchangeable attachments 20. Preferably a plurality of connection means 16 (16a-n) are provided as shown, extending substantially along the length of central section 11b, 12b of leash 11 and collar 12. Optionally, there may be provided only a small group of three or four connection means 16 (16a-n) provided along the length of central section 11b, 12b of leash 11 and collar 12.

As best illustrated at 50, the interchangeable attachments 20 (20a-n) include a top wall 21 having a show surface 22, side walls 23 (preferably shallow), and a back wall 24 having a securing member 25 integrated therein. Securing member 25 is adapted to engage with connection means 16 (16a-n) of central section 11b (or in the case of the collar 12, central section 12b) of the leash 11 for removably attaching the interchangeable attachment 20 (20a-n) to the leash 11 (or collar 12). Connection means 16 (16a-n) comprises at least one aperture as shown at 55. In the embodiment shown, securing member 25 of the interchangeable attachment 20 comprises a shaft portion 56 with a shaft end 57. Shaft portion 56 is received and housed within the aperture 55 comprising connection means 16 of central section 11b, 12b so that the interchangeable attachment 20 is removably attached to the leash 11, or collar 12. A locking cap 58 may be provided that is appointed to receive shaft end 57 of the shaft portion 56. Optionally, the securing member 25 (via shaft 56) of the interchangeable attachment 20 is composed of a magnetic material. Conversely, the connection means 16 (16a-n), herein apertures 55, of leash 11 or collar 12 would then be composed of a metal material.

Alternatively, securing member 25 of the interchangeable attachment 20 comprises a shaft portion 56 with a shaft end 57 formed as a bulbous portion (not shown) having a bulbous diameter slightly greater than the aperture 55 diameter of connection means 16 (16a-n). For ease of insertion into aperture 55, preferably the bulbous portion of the interchangeable attachment 20 is composed of a flexible or deformable material.

The show surface 22 of the interchangeable attachment 20 may include a gemstone, decorative glass or other decorative design piece attached thereto. In yet another embodiment, the interchangeable attachment 20 includes an electroluminescent light (LED) or fiber optics integrated therein, both for decoration purposes as well as to provide safety to a person or pet. As shown at 50, the electroluminescent light 61 is housed under top wall 21, which is provided with transparent properties so that light is 5 emitted. Preferably, side walls 23 also include transparent portions for the emission of light. LED 51 is attached to a battery 52 housed within shaft portion 56. The LED 51 and the optic light are used with a small watch battery, and last a long time, so battery life does not become a concern. The LED 51 (or fiber optic light) may be turned on by rotating the interchangeable attachment and thereby closing a circuit. Or the LED may 10 be turned on via motion sensor or by way of a light sensor so that the light is not turned on unless there is motion or it is dark out, thereby saving the battery life.

Alternatively, the show surface 22 of the interchangeable attachment 20 may include reflective properties. This has significant application when as applied to a child's back pack or bag, or a pet's collar and/or leash, in order to impart an added measure of 1 5 safety to the child and/or pet, respectively. Preferably, reflectivity is provided by the incorporation of retroreflective corner cube reflectors or microsphere reflective elements thermally bonded onto a strip that is bonded onto the top side 21 of the interchangeable attachment 20 to yield a reflective show surface 22 thereto.

Preferably, reflectivity is provided via a plurality of glass reflective elements or 20 beads bond to the show surface 22 so that the a large portion of light emitted from a light source is reflected back to the light source such that the pathway for the angle of reflection of the light is substantially the same as the pathway for the angle of incidence. With this structure, the show surface 22 reflects a significant quantum of the incident light from a car head light or other light emitting element back to the source. Reflectivity may be provided via corner cube prismatic or microsphere geometry bonded onto the show surface 22. These transparent retroreflective elements may be made from high refractive index transparent materials such as barium oxide-titanium oxide containing glasses. They exhibit a refractive index in the range of 1.9 to 2.2. Preferably, abrasion resistance properties are provided to the reflective show surface 22 by applying a transparent coating onto the show surface 22 of the interchangeable attachment 20. One such coating comprises a polymer that is transparent, flexible and has a refractive index significantly smaller than that of the retroreflective elements used. For example, thermosetting resin compositions such as two-component polyurethane may be painted or sprayed over the reflective show surface 22. Thermoplastic aliphatic thermoplastic polyurethanes are preferred as compared to aromatic urethanes because of their transparency, resistance to dirt build-up, flexibility ultraviolet radiation degradation resistance. Typically, aliphatic polyurethane has the structure

[—O—(CH(CH$_3$)CH2O$_{20}$—C(O)—NH—R—NH—C(O)—]; or

[—O—(CH$_2$—CH$_2$CH$_2$CH$_2$—O—)$_{10}$—C(O)—NH—R—NH—C(O)—], where R is a non-aromatic group. The thickness of the transparent abrasion resistant coating is in the range of 0.002 to 0.010 inches. The coating has a refractive index significantly lesser than that of retroreflective elements bonded to the reflective strip bond to the show surface 22 of the interchangeable attachment 20. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

Figure 2B:
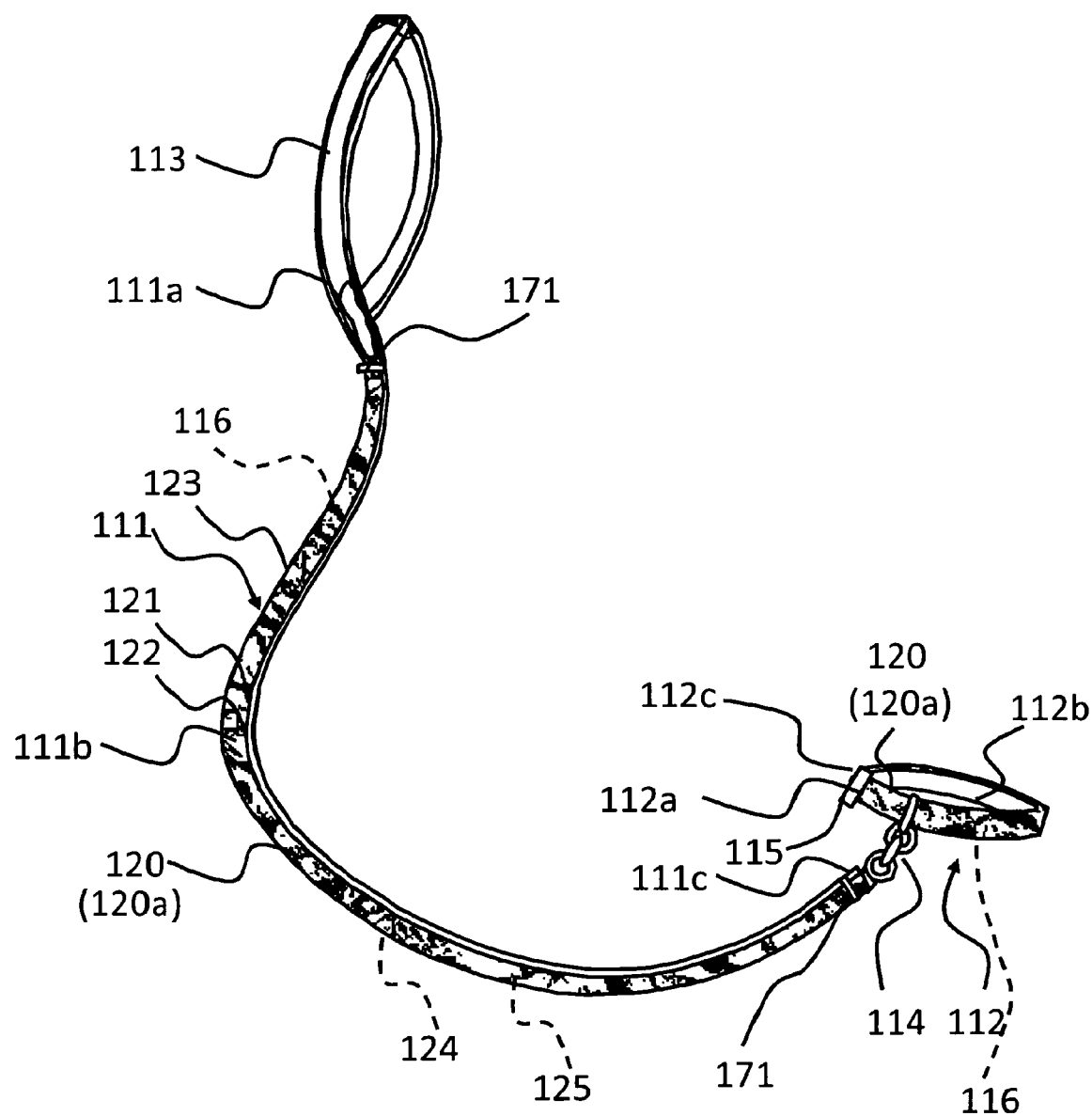
FIG. 2b is a schematic view of FIG. 2a presented after the elongated interchangeable attachment portions are attached to the leash and collar.

FIGS. 2a and 2b show views of another embodiment of the invention wherein elongated interchangeable attachment portions are provided. Particularly, FIG. 2a shows a schematic view wherein elongated interchangeable attachment portions are ready to be attached to the leash and collar, while FIG. 2b shows the elongated interchangeable attachment portions attached to the leash and collar. The article herein is shown as a leash and collar; however, the article can be a belt, purse, bag or backpack, or pet carrier. In FIG. 2a a leash 111 and collar 112 are shown with interchangeable attachments 120 being ready to be added thereon. Leash 111 and collar 112 each have at least one elongated region comprising a proximal end 111a, 112a, distal end 111c, 112c and a central section 111b, 112b. Proximal end 11 a of leash 111 includes a handle 113, while distal end 111c includes a clasp 114 (or may be looped and formed into a choke collar) appointed to be clipped to collar 112. Distal end 112c of collar 112 includes a buckle 115 appointed to receive proximal end 112a of collar 112 to clasp around a dog's neck. The central section 111b, 112b of the leash 111 and collar 112 has at least one connection means 116 appointed to receive interchangeable attachments 120. Preferably leash loops 171 are provided on each side of the hook and loop fastener strip/connection means 116.

In this embodiment, the interchangeable attachments 120 are provided as elongated attachment portions 120a adapted to substantially cover said central section 111b, 112b of leash 111 and collar 112. The elongated attachment portions 120 include a top wall 121 having a show surface 122, side walls 123 (preferably shallow), and a back wall 24 having a securing member 125 integrated therein. Securing member 125 is adapted to engage with connection means 116 of central section 111b (or in the case of the collar 112, central section 112b) of the leash 111 for removably attaching the interchangeable attachment 120 to the leash 111 (or collar 112).

Connection means 116 comprises at least one portion that is provided with attachment means—preferably being hook and loop fasteners such as sold under the trade name VELCRO. Preferably, connection means 116 attachment means substantially covers central section 111b of leach 111 (or 112b of collar 112), as shown. Conversely, at least a portion of the securing member 125 of elongated attachment portion includes mating hook and loop fasteners integrated therein. Preferably, the securing member 125 incorporates a substantial portion of the back wall 124 of the interchangeable attachment 120. The elongated attachment portion 120a may include reflective properties on its show surface 122 and/or along its side walls 123. Alternatively, the elongated attachment portion 120a includes at least one LED integrated under the show surface 122 and/or along its side walls 123. Moreover, the elongated attachment portion 120a may include at least one fiber optic filament therein. Wherein LED or fiber optics are integrated within the elongated attachment portion 120a a small battery is sown therein which may be operable by way of a power switch, light sensor or motion sensor integrated on the show surface of the elongated attachment portion 120a.

Figure 3A:
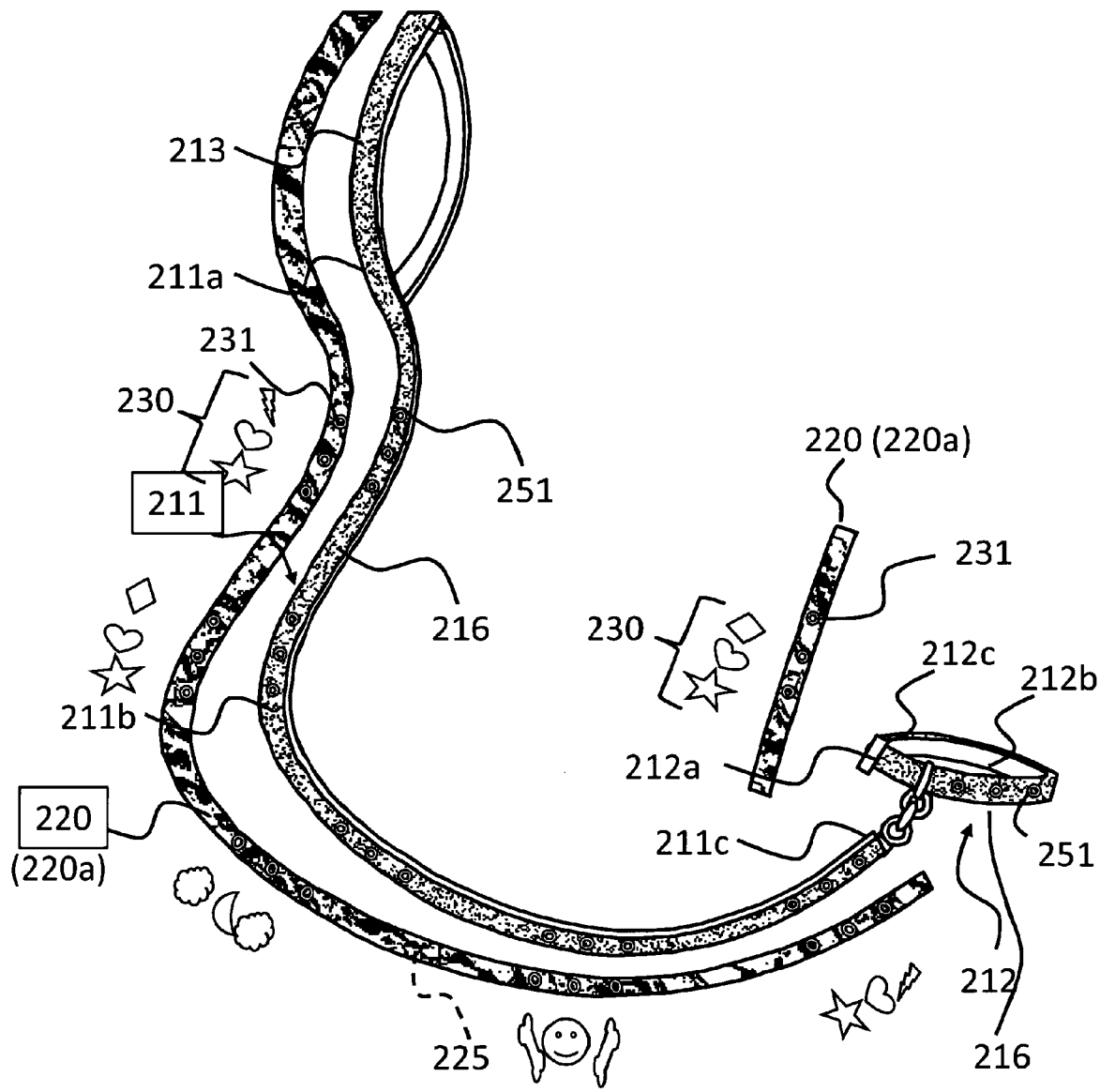
FIG. 3a is a schematic view of another embodiment of the interchangeable attachment for an article, showing a leash and collar wherein elongated interchangeable attachment portions are presented and are ready to be attached to the central portions of the leash and collar, as well as up into the proximal end of the leash where the handle is formed, and further shows the inclusion of button-type interchangeable attachments provided to be inserted onto the leash and collar.
Figure 3B:
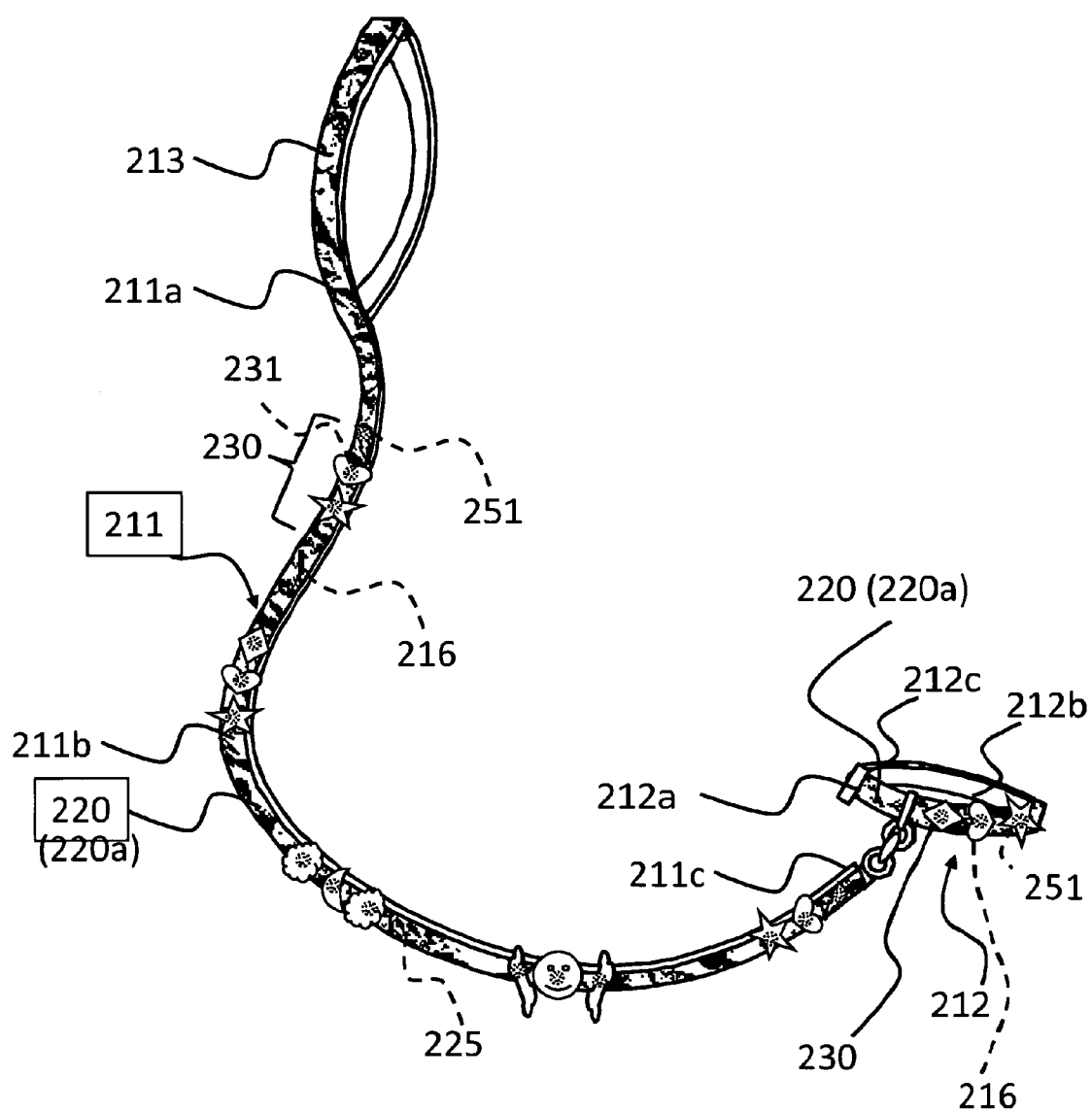
FIG. 3b is a schematic view of FIG. 3a presented after the elongated interchangeable attachment portions are attached to the leash and collar and the button-type interchangeable attachments are also added.

FIG. 3a is a schematic view of another embodiment of the interchangeable attachment for an article, showing a leash 211 and collar 212 wherein elongated interchangeable attachment portions 220a are presented and are ready to be attached to the central portions 211b, 212b, as described in FIG. 2a-2b above. Herein however, the snap-type interchangeable attachments 230 as described above regarding FIG. 1 are provided to be inserted onto the leash 211 and collar 212 and visa via the elongated interchangeable attachment portions 220a. Holes 231 are integrated in the elongated interchangeable attachment portions 220a for receiving the snap/button-type interchangeable attachments 230. In this embodiment, the elongated interchangeable attachment portions 220a is placed on the leash's 211 and collar's 212 central sections 211b, 212b and attached thereto via hook and loop fastener engagement of the connection means 216 and securing member 225 of the elongated interchangeable attachment portions 220a and leash's 211 and collar's 212 central sections 211b, 212b. Holes 231 of the elongated interchangeable attachment portions 220a are aligned with apertures 251 integrated into the leash's 211 and collar's 212 central sections 211b, 212b. After attachment of the elongated interchangeable attachment portions 220a to the leash's 211 and collar's 212 central sections 211b, 212b, the snap/button-type interchangeable attachments 230 are attached via holes 231 and apertures 251. FIG. 3b is a schematic view of FIG. 3a presented after the elongated interchangeable attachment portions are attached to the leash and collar and the snap/button-type interchangeable attachments are also added.

FIGS. 4a-4e illustrate a top view of the application of and selection of an elongated interchangeable attachment portion to a belt, leash, collar, or bag strap. FIG. 4a shows a leash 311 is provided having a proximal end 311a, distal end 311c and a central section 311b, with the central section 311b having a connection means 316 preferably provided as a hook and loop fastener strip as shown. Preferably leash loops 371 are provided on each side of the hook and loop fastener strip/connection means 316.

FIGS. 4b, 4c and 4d show optionally interchangeable attachments that are provided as elongated interchangeable attachment portions 320a are presented and are ready to be attached to the central portion 311b, as described in FIG. 2a-2b above. Each of the elongated interchangeable attachment portions 320a of FIGS. 4b, 4c and 4d are preferably different, having varying designs, reflective properties and/or LED or optical properties. The user simply selects one of the elongated interchangeable attachment portions 320a and attaches it onto the central section 311b of the leash 311 (or belt, or the like), as shown in FIG. 4e, wherein the elongated interchangeable attachment portion 320a of FIG. 4d has been selected as an example. Preferably leash loops 371 act as belt loops and hold down the ends of the elongated interchangeable attachment portion 320a after it is secured onto the leash 311. Herein only two leash loops 371 are provide, however, more loops may be provided.

Figure 5A:
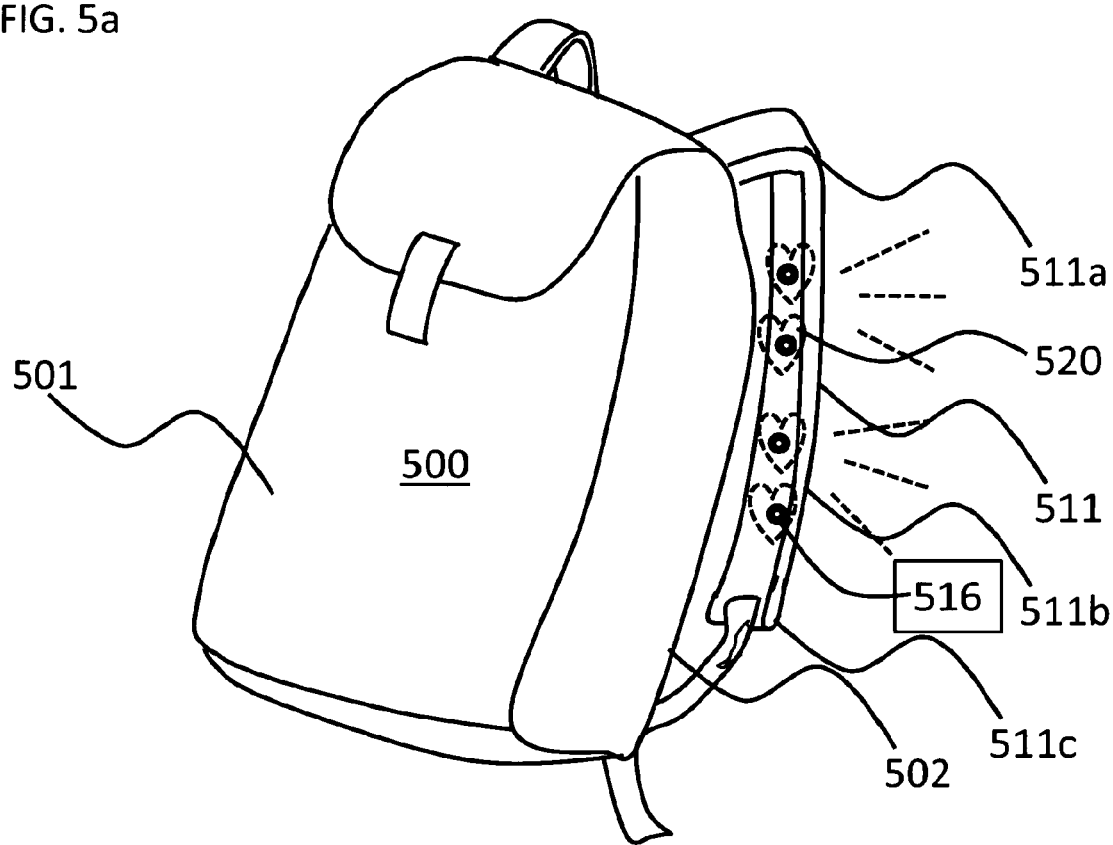
FIG. 5a shows a side view of a back pack with interchangeable attachments added-onto the straps thereof.
Figure 5B:
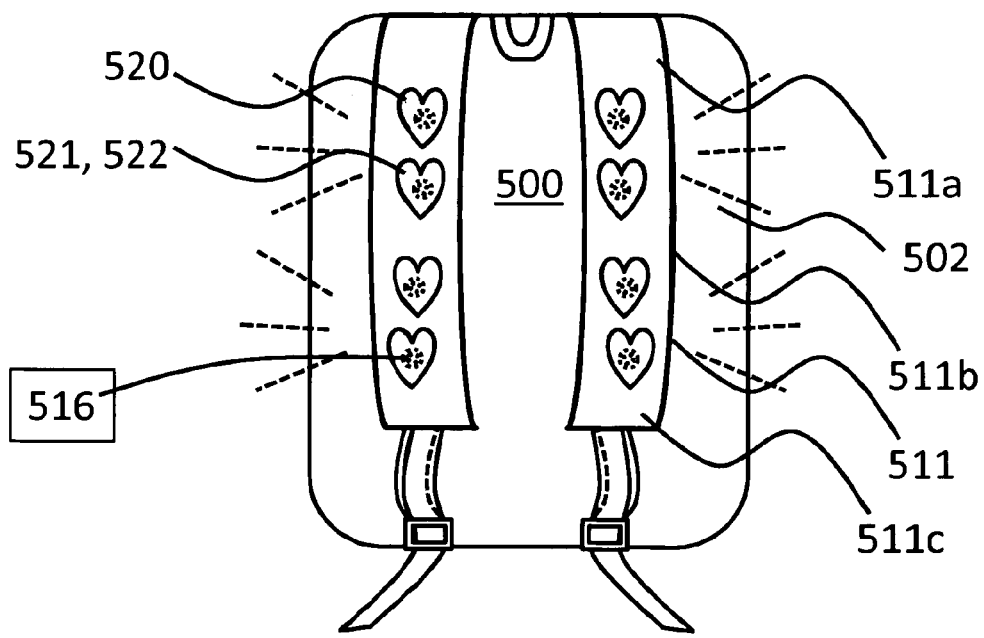

FIGS. 5a and 5b illustrate an embodiment of the invention as applied to a back pack. FIG. 5a shows a side view of a back pack with interchangeable attachments added-onto the straps thereof; and FIG. 5b shows a back view of the back pack of FIG. 5a. A back pack 500 is shown having a sack portion 501 and a back portion 502. Back portion 502 includes straps 511 integrated thereon. Straps 511 are provided as elongated regions comprising a proximal end 511a, distal end 511c and a central section 511b. The central section 511b has at least one connection means 516 (516a-n) appointed to receive interchangeable attachments 520. Preferably a plurality of connection means 516 (516a-n) are provided as shown, extending substantially along the length of central section 511b. The interchangeable attachments 520 (520a-n) include a top wall 521 having a show surface 522, side walls (preferably shallow), and a back wall having a securing member integrated therein. The securing member is adapted to engage with connection means 516 (516a-n) of central section 511b for removably attaching the interchangeable attachment 520 (520a-n) to the back pack 500. Connection means 516 (516a-n) comprises an aperture. Preferably the securing member of the interchangeable attachment 520 comprises a shaft portion with a shaft end, so that the shaft portion is received and housed within the aperture comprising connection means 516 of central section 511b. Optionally, the securing member of the interchangeable attachment 520 is composed of a magnetic material. Conversely, the connection means 516 (516a-n) would then be composed of a metal material. Preferably, the interchangeable attachment 520 includes LED properties so that a child wearing the backpack 500 is afforded enhanced safety while walking in dimly lit areas.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An interchangeable attachment for an article, wherein:
   a. said article has a proximal end, distal end and a central section;
   b. said central section of said article has at least one connection means appointed to receive said interchangeable attachment;
   c. said interchangeable attachment comprises a top wall having a show surface, side walls, and a back wall having a securing member adapted to engage with said connection means of said central section of said article for removably attaching said interchangeable attachment to said article; and
   d. said show surface of said interchangeable attachment includes an electroluminescent light integrated therein.

2. An interchangeable attachment for an article as recited by claim 1, wherein said article is a leash or collar for a pet.

3. An interchangeable attachment for an article as recited by claim 1, wherein said article is a belt.

4. An interchangeable attachment for an article as recited by claim 1, wherein said article is a purse, bag or backpack, or pet carrier.

5. An interchangeable attachment for an article as recited by claim 1, wherein said show surface of said interchangeable attachment includes reflective properties.

6. An interchangeable attachment for an article as recited by claim 1, wherein said show surface of said interchangeable attachment includes a gemstone, decorative glass or other decorative design piece attached thereto.

7. An interchangeable attachment for an article as recited by claim 1, wherein said connection means of said central section of said article comprises at least one aperture and said securing member of said interchangeable attachment comprises a shaft portion with a shaft end, where said shaft portion is received and housed within said connection means of said central section so that said interchangeable attachment is attached to said article.

8. An interchangeable attachment for an article as recited by claim 7, wherein a plurality of apertures are integrated within said central section of said article.

9. An interchangeable attachment for an article as recited by claim 1, wherein either said connection means of said article or said securing member of said interchangeable attachment is composed of a magnetic material and a metal material, respectively.

10. An interchangeable attachment for an article as recited by claim 1, wherein said connection means of said central section of said article comprises at least one aperture having an aperture diameter and said securing member of said interchangeable attachment comprises a shaft portion with a shaft end having a bulbous portion having a bulbous diameter slightly greater than said aperture diameter.

11. An interchangeable attachment for an article as recited by claim 1, wherein said interchangeable attachment is an elongated attachment portion adapted to substantially cover said central section of said article.

12. An interchangeable attachment for an article as recited by claim 11, wherein said elongated attachment portion includes reflective properties.

13. An interchangeable attachment for an article as recited by claim 11, wherein said elongated attachment portion includes at least one LED.

14. An interchangeable attachment for an article, wherein:
   a. said article has a proximal end, distal end and a central section;
   b. said central section of said article has at least one connection means appointed to receive said interchangeable attachment;
   c. said interchangeable attachment comprises a top wall having a show surface, side walls, and a back wall having a securing member adapted to engage with said connection means of said central section of said article for removably attaching said interchangeable attachment to said article; and
   d. said show surface of said interchangeable attachment includes fiber optics integrated therein.

15. An interchangeable attachment for an article, wherein:
   a. said article has a proximal end, distal end and a central section;
   b. said central section of said article has at least one connection means appointed to receive said interchangeable attachment;
   c. said interchangeable attachment comprises a top wall having a show surface, side walls, and a back wall having a securing member adapted to engage with said connection means of said central section of said article for removably attaching said interchangeable attachment to said article;
   d. said connection means of said central section of said article comprises at least one aperture and said securing member of said interchangeable attachment comprises a shaft portion with a shaft end, where said shaft portion is received and housed within said connection means of said central section so that said interchangeable attachment is attached to said article; and
   e. said securing member of said interchangeable attachment further comprises a locking cap appointed to receive said shaft end of said shaft portion.

16. An interchangeable attachment for an article, wherein:
   a. said article has a proximal end, distal end and a central section;
   b. said central section of said article has at least one connection means appointed to receive said interchangeable attachment;
   c. said interchangeable attachment comprises a top wall having a show surface, side walls, and a back wall having a securing member adapted to engage with said connection means of said central section of said article for removably attaching said interchangeable attachment to said article; and
   d. either said connection means of said article or said securing member of said interchangeable attachment is composed of a magnetic material and a metal material, respectively.

17. An interchangeable attachment for an article, wherein:
a. said article has a proximal end, distal end and a central section;
b. said central section of said article has at least one connection means appointed to receive said interchangeable attachment;
c. said interchangeable attachment comprises a top wall having a show surface, side walls, and a back wall having a securing member adapted to engage with said connection means of said central section of said article for removably attaching said interchangeable attachment to said article;
d. said connection means of said central section of said article comprises at least one aperture having an aperture diameter and said securing member of said interchangeable attachment comprises a shaft portion with a shaft end having a bulbous portion having a bulbous diameter slightly greater than said aperture diameter; and
e. said bulbous portion of said interchangeable attachment is composed of a flexible material.

18. An interchangeable attachment for an article, wherein:
a. said article has a proximal end, distal end and a central section;
b. said central section of said article has at least one connection means appointed to receive said interchangeable attachment;
c. said interchangeable attachment comprises a top wall having a show surface, side walls, and a back wall having a securing member adapted to engage with said connection means of said central section of said article for removably attaching said interchangeable attachment to said article;
d. said interchangeable attachment is an elongated attachment portion adapted to substantially cover said central section of said article; and
e. at least a portion of each of said securing member of said elongated attachment portion and said connection means of said central section of said article include mating hook and loop fasteners.

19. An interchangeable attachment for an article, wherein:
a. said article has a proximal end, distal end and a central section;
b. said central section of said article has at least one connection means appointed to receive said interchangeable attachment;
c. said interchangeable attachment comprises a top wall having a show surface, side walls, and a back wall having a securing member adapted to engage with said connection means of said central section of said article for removably attaching said interchangeable attachment to said article;
d. said interchangeable attachment is an elongated attachment portion adapted to substantially cover said central section of said article; and
e. said elongated attachment portion includes at least one fiber optic device.

* * * * *